(No Model.)
S. C. CASE.
HANDLE FOR PEACH BASKETS.
No. 359,241. Patented Mar. 15, 1887.
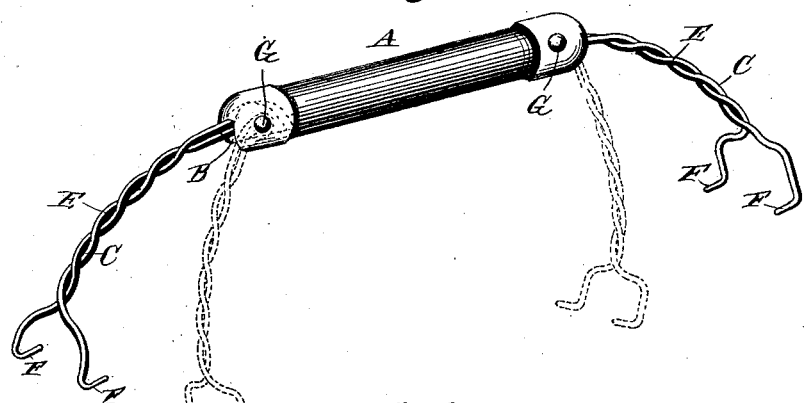
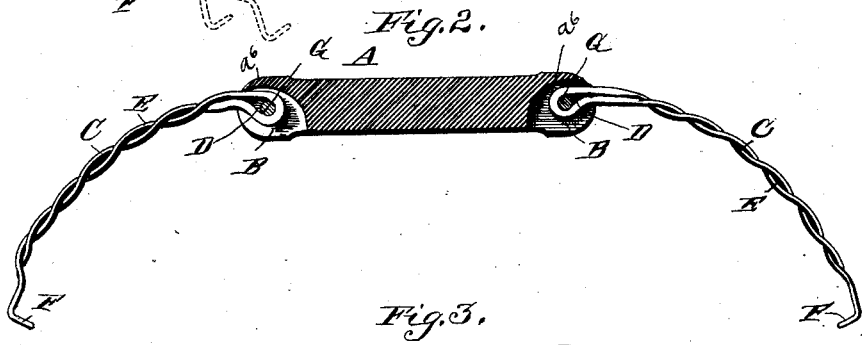
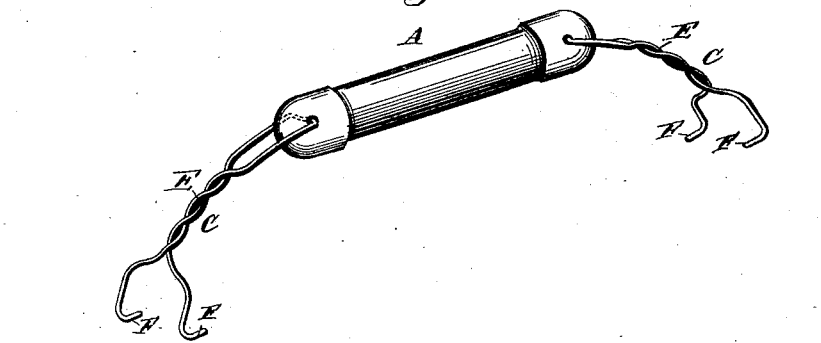
Witnesses
Chas. L. Taylor
J. W. Gardner
Inventor
Samuel C. Case
By his Attorneys

UNITED STATES PATENT OFFICE.

SAMUEL C. CASE, OF FLEMINGTON, NEW JERSEY.

HANDLE FOR PEACH-BASKETS.

SPECIFICATION forming part of Letters Patent No. 359,241, dated March 15, 1887.

Application filed November 26, 1886. Serial No. 219,977. (No model.)

*To all whom it may concern:*

Be it known that I, SAMUEL C. CASE, a citizen of the United States, residing at Flemington, in the county of Hunterdon and State of New Jersey, have invented a new and useful Improvement in Handles for Peach-Baskets, of which the following is a specification.

My invention relates to an improvement in handles for peach-baskets; and it consists in the peculiar construction and combination of devices that will be more fully set forth hereinafter, and particularly pointed out in the claims.

In the drawings, Figure 1 is a perspective view of a peach-basket handle embodying my improvements. Fig. 2 is a vertical longitudinal sectional view of the same. Fig. 3 is a perspective view of a modified form of my invention.

A represents a handle, which is made of wood and is turned to the desired form, and is provided at its ends with slots B.

C represents arms, which are each made of a single piece of wire that is bent at the center to form an eye, D, and the end portions of the wire are then twisted together, as at E. The extremities of the wire are spread apart, and are turned to form hooks F, arranged on the same plane, but separated from each other.

G represents pivotal screws or pins, which pass through the ends of the handle A and through the eyes D of the arms, so as to pivot the inner ends of the said arms in the slots B of the handle. The upper side of the said slots form stops $a^6$, which strike against the upper side of the arms C, near the inner ends thereof, so as to prevent the said arms from swinging over the ends of the handles.

The hooks F are formed by bending the ends of the wire at right angles, and not by turning up the ends of the wire. The ends of the wire forming the hooks thus occupy a horizontal plane, which can readily engage under the rim of the fruit-basket.

The operation of my invention is as follows: In order to lift and carry a peach-basket, the operator moves the arms C outwardly, and inserts the hooks F thereof under the projecting rim or flange at the upper edge of the peach-basket. He then grasps the handle and raises the same, which causes the hooks to engage the rim or flange at the upper side of the peach-basket, and the latter is then easily carried about. In order to detach the handle from the basket, it is only necessary to bear downwardly on the handle, which instantly causes the arms C to diverge and release their hold upon the basket. When the device is not in use, the pivoted arms may be folded against the handle and parallel with each other, so as to enable the device to be packed or stored in a very small space, thus rendering it convenient to carry the same in a pocket.

This improved handle will be found extremely useful in carrying peaches from the orchard or in markets, and also in carrying vegetables in peach-baskets.

In Fig. 3 I illustrate a modified form of my invention, in which the slots B in the ends of the handle are entirely dispensed with, and the arms are pivoted to the ends of the handle by first inserting the wires of which the arms are formed, and before the latter are twisted through transverse openings in the ends of the handle, and then twisting the ends of the wires together and forming the hooks thereon, as shown.

While I prefer two hooks F, as shown, still I do not wish to be limited to such an arrangement. Two hooks provide an additional bearing or engaging surface.

Having thus described my invention, I claim—

1. The wooden handle A, having openings in the ends thereof, in combination with the arms C, each formed from a single piece of wire doubled at the center and having the two branches twisted together throughout their length, and then spread apart and turned inward horizontally (but not upward) to form hooks F, that are arranged on the same horizontal plane and separated from each other, the arms C being pivoted at the doubled portion of the wire within the openings at the ends of the handle, as set forth.

2. The combination of the wooden handle and the arms C, formed each of a single piece of wire, the ends of which are twisted together throughout the arms and are bent to form the hooks F, the said arms C being pivoted to the ends of the handle, and stops $a^6$, to limit the movement of the arms C, substantially as described.

3. The wooden handle A, in combination with the arms C, formed of a single piece of wire, the ends of which are twisted together throughout the arms and bent to form the hooks F, slots provided at the ends of the handle, forming stops $a^6$, the said arms C being pivoted to the handle A within the slots, as set forth.

In testimony that I claim the foregoing as my own I have hereto affixed my signature in presence of two witnesses.

SAMUEL C. CASE.

Witnesses:
JOHN L. JONES,
WILLIAM H. HALL.